United States Patent
Michelman et al.

(10) Patent No.: US 7,148,271 B2
(45) Date of Patent: *Dec. 12, 2006

(54) WATER-BORNE RESIN TREATMENT FOR FIBROUS MATERIALS, PROCESS OF TREATING, AND PRODUCT PRODUCED THEREBY HAVING IMPROVED STRENGTH UNDER BOTH AMBIENT AND WET/HUMID CONDITIONS

(75) Inventors: Richard I. Michelman, Cincinnati, OH (US); Scot E. Duckworth, Southgate, KY (US)

(73) Assignee: Michelman, Inc., Cincinnati, OH (US)

( * ) Notice: Subject to any disclaimer, the term of this patent is extended or adjusted under 35 U.S.C. 154(b) by 492 days.

This patent is subject to a terminal disclaimer.

(21) Appl. No.: 10/208,922

(22) Filed: Jul. 30, 2002

(65) Prior Publication Data

US 2003/0003285 A1 Jan. 2, 2003

Related U.S. Application Data

(63) Continuation of application No. 09/515,132, filed on Feb. 29, 2000, now Pat. No. 6,429,240.

(51) Int. Cl.
*B29C 47/00* (2006.01)

(52) U.S. Cl. .................. 524/13; 524/270; 524/274; 524/275; 524/276; 524/277

(58) Field of Classification Search ............... 524/13, 524/270, 274, 275, 276, 277
See application file for complete search history.

(56) References Cited

U.S. PATENT DOCUMENTS 3,607,598 A    9/1971  LeBlanc et al.
3,616,163 A   10/1971  Reisman
3,617,427 A   11/1971  LeBlanc
3,617,428 A   11/1971  Carlson
3,617,429 A   11/1971  LeBlanc
3,619,341 A   11/1971  Elmer
3,619,342 A   11/1971  Burke
3,682,762 A    8/1972  LeBlanc
3,687,767 A    8/1972  Reisman et al.
3,697,365 A   10/1972  Reisman et al.
3,886,019 A    5/1975  Wilkinson et al.
4,051,277 A    9/1977  Wilkinson et al.
4,096,305 A    6/1978  Wilkinson et al.
4,096,935 A    6/1978  Hanakata et al.
5,190,997 A    3/1993  Lindemann et al.
5,332,458 A    7/1994  Wallick
5,527,623 A    6/1996  Takahira et al.
5,545,449 A    8/1996  Tiedeman
5,567,798 A   10/1996  Dulany et al.
5,650,458 A    7/1997  Wagner
5,994,449 A   11/1999  Maslanka
6,429,240 B1 * 8/2002  Michelman et al. .......... 524/13

FOREIGN PATENT DOCUMENTS

EP     0 537 682 A1   4/1993
WO     WO 99/32719    7/1999
WO     WO 99/57371    11/1999

* cited by examiner

*Primary Examiner*—Edward J. Cain
(74) *Attorney, Agent, or Firm*—Dinsmore & Shohl LLP

(57) ABSTRACT

A water-borne resin composition which can be readily applied to treat fibrous substrates at ambient temperatures and which provides enhanced strength and rigidity for the substrate under both ambient as well as wet or humid conditions is provided. Preferably, paper substrates treated with the resin are capable of being repulped and recycled.

11 Claims, No Drawings

WATER-BORNE RESIN TREATMENT FOR FIBROUS MATERIALS, PROCESS OF TREATING, AND PRODUCT PRODUCED THEREBY HAVING IMPROVED STRENGTH UNDER BOTH AMBIENT AND WET/HUMID CONDITIONS

CROSS REFERENCE TO RELATED APPLICATIONS

This application is a continuation of U.S. patent application Ser. No. 09/515,132, filed Feb. 29, 2000, now U.S. Pat. No. 6,429,240, issued Aug. 6, 2002.

BACKGROUND OF THE INVENTION

The invention relates to a water-borne resin composition used to treat fibrous substrates to improve their strength under both ambient as well as wet or humid conditions, and more particularly to a paper substrate treated with a resin composition, which treated substrate is preferably capable of being both repulped and recycled.

Fibrous substrates, including corrugated and non-corrugated paperboards, papers, and other cellulosic substrates are useful for an extremely wide variety of applications, but particularly for making containers such as packaging and shipping containers. Other products include towels, tissues, spiral cans, folding carton stock, molded pulp products, and the like.

Typical processes for forming corrugated materials are well known. For example, a corrugated board may be formed on a corrugator where large rolls of linerboard paper and a large roll of the medium paper (the starting raw material for forming the corrugated core layer) will be positioned at the upstream end of the corrugator. The process normally has the medium passing through a set of corrugating rolls and thereafter being bonded to the first liner as it travels in a downstream direction. A suitable adhesive is utilized to attach the flute tips of the corrugated medium to the inside surface of the first liner.

Thereafter, at a downstream location, the other liner material is bonded to opposing flute tips of the corrugated medium with a suitable adhesive to form the combined board. Thereafter the combined board travels into a heating section to allow the adhesive to cure fully and to bond the liners to the fluted (corrugated) medium. Thereafter, slitter-scorer and cutoff devices function to produce individual sheets of slit and scored blanks for converting into containers.

As is well recognized by those skilled in the art, the structural requirements for combined board are determined by the particular requirements of the end use. Standards have been developed over the years, and both the liner and medium materials are manufactured to preselected basis weights with the end-use requirements in mind. In a container, a particularly important property is vertical stacking strength (top to bottom) where the vertical walls in a container are expected to support in-use compression loadings. In almost all packaging end uses, the fluted medium will be oriented in a vertical direction in the container side walls. In this orientation the liners and fluted medium will provide good vertical stacking strength. The vertical stacking strength for a container depends to a large extent upon the basis weights of the component materials. Using higher basis weights for the component materials results in higher vertical stacking strengths and normally greater top-to-bottom compression resistance. Obviously, in order to create the higher basis weights, additional fiber must be utilized which adds to the cost of producing the combined board and the resulting container.

Ways have been sought for many years to increase stacking strength and/or crush resistance of corrugated containers without the need for using additional fiber (higher basis weight). Various stiffening agents, such as thermosetting polymers, have been sprayed or coated onto one or both liner sheets, or onto the medium, at some point in the manufacturing process. However, many such thermosetting resins require the use of heat to cure them, and when cured, they may produce a carton or container blank which is brittle and difficult to fold. There may also be environmental problems if solvents are used in conjunction with the application of such thermosetting resins or if there is off-gassing of reaction by-products.

Another drawback to many fiberboards, including both corrugated and non-corrugated paperboard, is their poor rigidity when exposed to humid or wet conditions. To overcome this shortcoming, manufacturers have tried various ways of reinforcing fiberboard and/or improving the water or moisture resistance of the fiberboard. Examples of these attempts include impregnating or coating the fiberboard with paraffin waxes (including hot melts) or other polymeric materials.

Paraffin wax coatings substantially decrease the tendency of the fiberboard to absorb water, making paraffin-reinforced corrugated paperboard popular for use in packaging produce, poultry, and meats. Unfortunately, paraffin has several disadvantages, including being readily softened by moderately elevated temperatures. Also, it renders the container non-recyclable and non-repulpable because of the difficulties encountered in attempting to separate the wax coating from the cellulosic fiber using conventional equipment. In addition, paraffin tends to melt into other liners, causing unsightly grease and stain marks. Finally, paraffin waxes are flammable, and thus introduce safety concerns.

In view of the shortcomings of reinforcing fiberboard using paraffin, other polymeric resins, particularly various thermoset materials (i.e., materials which do not soften after cure), have been considered for this purpose. Many cured thermosets have the advantage of being very rigid. As a result, fiberboards reinforced with cured thermosets tend to have high resistance to compression. Unfortunately, many currently favored thermosets are extremely brittle after being fully cured and fracture when subsequently creased or folded. Such fracturing of the thermoset reinforcing agent can readily extend to the fiberboard itself, thereby seriously reducing the integrity of the container made therefrom along edges and at corners.

Examples of such thermosets include phenolic resins which have been applied as 100%-solids liquid solutions and then cured. Representative U.S. Pat. Nos. disclosing use of phenolic resins include U.S. Pat. Nos. 3,886,019, 4,096,935, 4,051,277, and 4,096,305 to Wilkenson et al. These patents disclose the application of thin films of phenolic resins to surfaces of linerboards and corrugated medium that will be adhered together to form the corrugated paperboard. After adhering together the linerboards and corrugated medium, the corrugated paperboard can be cut, scored, and slotted to make box blanks. Because of the brittleness of the fully cured treated board, full curing of the resin is delayed until after the box blanks have been folded to make cartons.

Various thermoset blends of phenolic resins with other resins have also been tried in an attempt to reduce the brittleness of phenolic resin alone. Representative U.S. patents include Reisman et al U.S. Pat. No. 3,687,767

(phenol-aldehyde); LeBlanc et al., U.S. Pat. No. 3,607,598 (phenol-aldehyde plus polyvinyl alcohol); Reisman, U.S. Pat. No. 3,616,163 (phenol-aldehyde resole); Elmer, U.S. Pat. No. 3,619,341 (phenol-aldehyde resole); Burke, U.S. Pat. No. 3,619,342 (phenol-aldehyde resole); Reisman et al., U.S. Pat. No. 3,697,365 (resole phenolic plus an organosilyl compound); LeBlanc, U.S. Pat. No. 3,682,762 (resole phenolic plus polyaminoalkyl substituted organosiloxane); LeBlanc, U.S. Pat. No. 3,617,427 (aminoplast-modified phenol-aldehyde resole); Carlson, U.S. Pat. No. 3,617,428 (aminoplast with phenol-aldehyde resole); and LeBlanc, U.S. Pat. No. 3,617,429 (aminoplast plus phenol-aldehyde and polyvinyl alcohol). Other reinforcing materials which have been utilized in this art include polyether materials (Tiedeman, U.S. Pat. No. 5,545,449) and isocyanate resins (Wallick, U.S. Pat. No. 5,332,458). However, brittleness and high cost problems remain. Further, such reinforcing materials render the containers non-recyclable and non-repulpable because of difficulties in separating the reinforcing materials from the cellulosic fibers using conventional equipment.

Accordingly, there remains a need in the art for a water-borne material which can be used to treat fibrous substrates which improves the strength of such substrates under both ambient as well as wet or humid conditions, and which is non-staining to the substrate, and to a treated substrate which is preferably capable of being repulped and recycled.

SUMMARY OF THE INVENTION

The present invention meets that need by providing a water-borne resin composition which can be readily applied to fibrous substrates at ambient temperatures and which provides enhanced strength and rigidity for the substrate under both ambient as well as wet or humid conditions. As used herein, "ambient" humidity is intended to encompass relative humidities in the range of from about 10 to about 85% RH. As used herein, "humid" is intended to encompass high relative humidities of greater than about 85% RH. Alternatively, use of the resin to treat fibrous substrates permits the use of lower basis weight materials to achieve strengths under both ambient as well as wet or humid conditions which otherwise would require the use of higher basis weight materials. Further, use of the resin composition to treat fibrous substrates improves the strength properties of recycled papers or other lower grade papers. The resin treated materials are also preferably capable of being repulped and recycled.

The strength of paper or fibrous substrates can refer to burst or tensile strength or to strength when compressive forces are applied to the substrate. As used herein, "strength" is primarily directed to the stiffness and/or rigidity of the substrate when subjected to compressive tests such as ring crush (RC), edge crush (ECT), and box compression (BCT) tests. However, strength may also refer to tensile and burst strength as the context requires.

In accordance with one aspect of the invention, a reinforced fibrous material is provided and includes at least one fibrous substrate having first and second major surfaces. At least one major surface of the fibrous substrate has been treated with a water-borne resin composition which when dried provides the fibrous material with increased strength under ambient as well as wet or humid conditions. As used herein, "treat," "treatment," and "treated" all refer to processes in which the resin composition is applied to the surface of the substrate. It is intended that these terms encompass processes and substrates in which the resin composition remains on the surface of the substrate, as well as those processes and substrates where the resin at least partially penetrates the surface of the substrate and impregnates at least a portion of its thickness.

The reinforced fibrous material is preferably capable of being repulped. Preferably, the fibrous substrate comprises cellulosic fibers such as wood-pulp fibers. The water-borne resin is a natural resin or a synthetic resin.

The invention also includes a process for enhancing the strength of a fibrous substrate under both ambient as well as wet or humid conditions, including providing a fibrous substrate having first and second major surfaces, treating at least one of the major surfaces of the fibrous substrate with a reinforcing treatment comprising a water-borne resin composition, and drying the fibrous substrate. Preferably, the water-borne resin composition is applied to provide a composition weight (based on dry resin) of from about 0.2 to about 5.0 pounds per 1000 $ft^2$(MSF). The water-borne resin compositions of the present invention may be readily dried using conventional equipment, and it is a feature of the present invention that the water-borne resins may be applied to a substrate (preferably in the form of a continuous web of material) either in-line during manufacture or off-line as a pretreatment. For example, where the substrate forms one or more layers in a multi-wall product such as corrugated board or multi-wall bags or containers, some or all of such layers may be treated off-line.

Accordingly, it is a feature of the present invention to provide a water-borne resin material which can be readily applied to fibrous substrates and which, when dried, provides enhanced strength for the substrate under both ambient as well as wet or humid conditions. Alternatively, it is a feature of the present invention that use of the resin on fibrous substrates permits the use of lower basis weight or lower quality materials to achieve strengths under both ambient as well as wet or humid conditions which otherwise would require the use of higher basis weight materials. These, and other features and advantages of the present invention, will become apparent from the following detailed description and the appended claims.

DETAILED DESCRIPTION OF THE PREFERRED EMBODIMENT

The present invention provides a method of treating a fibrous substrate with a water-borne resin and then drying the resin to provide a treated substrate having improved strength under both ambient as well as wet and/or humid conditions. The resulting treated substrate is also preferably capable of being repulped and recycled. This provides a substantial advantage over prior art wax treatments which render paper substrates non-repulpable and non-recyclable.

As referred to herein, the term "fibrous substrate" includes both woven and non-woven fibers. Typically, although not necessarily, the substrate will be in the form of a sheet or web having a length, a width, an obverse face, a reverse face generally parallel to the obverse face, and a thickness which extends between the obverse and reverse faces. As is typical with fibrous substrates, the thickness dimension is porous, at least to some degree.

Representative fibers, not intended to be limiting, comprising the substrate are hydrophilic fibers such as cellulosic fibers (e.g., cotton, wood pulp, rayon), carbohydrate fibers, polyvinyl alcohol fibers, substituted cellulosic fibers, glass fibers, mineral fibers, proteinaceous fibers (e.g., silk); and hydrophobic fibers such as sized wood pulp, cotton, or rayon fibers, polyethylene fibers, polypropylene fibers, polyester fibers, nylon fibers, poly(vinyl acetate) fibers, treated glass fibers, and aramid fibers; and mixtures of these fibers. If the fibers are synthetic polymeric fibers, the fibers can be spun-bonded or heat-bonded.

A "reinforced fibrous material" is a product according to the present invention made from a web of fibers, which may be in the form of a sheet having one or more layers, or a molded product. When the web is used to make sheet-like materials such as paper or fiberboard, the fibers are preferably comprised substantially of wood pulp fibers, and the product is referred to as a "reinforced paperboard." By way of example, and not intended to be limiting, representative basis weights of webs comprising wood pulp fibers (i.e., paperboards) range from about 10 to about 90 pounds per thousand square feet. It will be appreciated that, as different fibrous materials have different specific gravities and as webs made from different fibrous materials may have different densities, suitable basis weight ranges for other types of fibers may be different from the stated range for wood pulp fibers.

By "water-borne" we mean a composition in which water forms the continuous phase, with other active materials in the composition forming the discontinuous phase. Water is meant to include water having an acid or base added to adjust the pH of the composition and may further include (but is not to be limited by) one or more co-solvents such as alcohols, ketones, ethers, aldehydes, mineral spirits, and diols. Preferably the water-borne composition can be diluted (either water added to the composition or the composition added to water) without immediate separation, gellation, or precipitation of the dispersed phase. Generally, but not necessarily, a water-borne composition within the scope of the present invention will be one which contains from about 5 to about 98% water by weight, preferably from about 25 to about 98% water by weight, and most preferably from about 40 to about 98% water by weight. Excluded from the definition of "water-borne" are materials which are applied as 100% solids materials (i.e., hot melts and waxes, even if in liquid form) and materials which are applied using a non-aqueous carrier or solvent.

By "resin" we mean an organic composition or salt thereof which may be solid, semi-solid, or liquid, of natural or synthetic origin. The term resin also includes blends of such organic compositions. Synthetic resins may be prepared by the polymerization of unsaturated constituents of petroleum, terpene, or coal-tar resins, including coal-tar pitch.

Examples of natural resins include, but are not limited to, rosins, fossil resins, mined resins, secretion products from insects (shellac), and chemical derivatives and adducts of such natural resins. Typically, rosins are a mixture of resin acids and esters. Rosins include, but are not limited to naval stores, oleoresins, tall oil, wood or gum rosins from tree and plant extrudates, wood extracts or by-products of paper manufacturing, lipophilic extractives, and some tackifying resins. Wood extracts include, but are not limited to terpenoids including polymers made from monoterpenoids (such as α-pinene, β-pinene, and dipentenes), sesquiterpenoids, diterpenoids (including labdanes), sesterterpenoids, triterpenoids, tetraterpenoids, and polyterpenoids. Examples of resin acids include tricyclic diterpenoids including pimaranes such as pimaric acid, sandaracopimaric acid, isopimaric acid, delta$^8$-isopimaric acid, 7,15-pimaradienoic acid, and delta$^8$-pimaric acid; abietanes such as abietic acid, levopimaric acid, palustric acid, neoabietic acid, dehydroabietic acid, dihydroabietic acid, and tetrahydroabietic acid. Examples of resin acid derivatives include, but are not limited to, rosin esters (such as glycerol ester of rosin acid and pentaerythritol ester of rosin acid), rosin fumarics, rosin maleics, rosin phenolics, fortified rosins, and hydrogenated rosins.

Synthetic resins within the scope of the present invention include those resins resulting from controlled chemical reactions, such as polyaddition or polycondensation between well-defined reactants which themselves do not have the characteristics of resins (ISO 4618/3). They are also obtained by the polymerization of unsaturated monomers. A sub-grouping of synthetic resins are hydrocarbon resins produced by the polymerization of coal tar, petroleum, and turpentine feed stocks. Such synthetic hydrocarbon resins include, but are not limited to, resins from C4 to C12 (4 to 12 carbon atoms) aliphatic or aromatic monomers. Examples of such monomers include C4 monomers containing olefins to produce polybutene resins; C5 monomers containing linear and cyclic olefins to produce aliphatic resins; C8/C9 monomers containing unsaturated aromatics such as α-methylstyrene and vinyltoluene to produce aromatic resins; dicyclopentadiene; and blends of the above. Also included in this class are aliphatic monomers (typically C4 and C5) such as methylbutene, isoamylene, isoprene, pentadiene, piperylene, cyclopentadiene, pentene, cyclopentene, methylpentene, butene, and isobutene; aromatic monomers (typically C8, C9, and C10) such as coumarone, indene, methylindene, dimethylindene, α-methylstyrene, vinyltoluene, and methylcoumarone; dicyclopentadiene and derivatives (including codimers with cyclopentadiene and other monomers); terpenes such as α-pinene,β-pinene, dipentene (limonene), other terpenes; butenes; hydrogenated or derivatized C4 to C12 monomers and isomers thereof; and resins from blends of such monomers.

It is also within the scope of the present invention to provide a resin composition which comprises blends of natural and synthetic resins, blends of synthetic resins, and blends of natural resins.

By "capable of being repulped" we mean a treated fibrous material which can be repulped as provided in the Technical Association of the Pulp and Paper Industry (TAPPI) procedure TM205 to provide an acceptable hand sheet.

A "water-borne resin composition" as used herein is a liquid formulation comprising water and resin, as that term has previously been defined. A water-borne resin composition within the scope of the present invention will be one which contains from about 5 to about 98% water by weight, preferably from about 25 to about 98% water by weight, and most preferably from about 40 to about 98% water by weight. The resin may itself be a liquid dispersed or emulsified in water. Alternatively, the resin may be a solid which is dispersed or emulsified. Conventional dispersion and emulsification techniques may be used. The water-borne resin composition may also include other additives such as, but not limited to, other polymers, fillers, waxes, preservatives, leveling agents, plasticizers, surfactants, dyes, and defoamers. Typically, the water-borne resin composition will have the consistency of water as prepared and applied; however, a higher viscosity solution may be used as well. That is, the water-borne resin composition should have a viscosity at ambient temperature of less than about 10,000 centipoise, preferably less than about 1,000 centipoise, and most preferably from between about 50 to about 400 centipoise (as measured by Brookfield viscometer at 60 rpm).

Because the water-borne resin composition typically is of a watery (i.e., low viscosity) consistency when applied to a fibrous substrate, it penetrates readily into virtually any porous fibrous material. However, it is within the scope of the present invention to apply the water-borne resin solution using a co-solvent such as, for example, alcohols, ketones, mineral spirits, diols, and ethers. Typically, the water-borne resin will impregnate the fibrous substrate to some extent. However, it is also within the scope of the present invention for the water-borne resin composition to be applied to, and remain on, the surface of the fibrous substrate. The water-borne resin composition may be applied to one or both major surfaces of the fibrous sheet, web, or three-dimensional object. Unlike prior art wax compositions, the water-borne resin compositions of the present invention typically will not stain or discolor the treated substrate, nor will they typically bleed into adjacent substrates. Further, fibrous substrates which are treated in accordance with the present invention are printable using water-based inks.

As the water-borne resin composition is applied to a fibrous substrate such as a sheet, web, or three-dimensional object, it may be absorbed into the porous surfaces of some substrates. The depth of absorption may be controlled by controlling the "loading" and viscosity of the water-borne resin composition onto the surface of the web, sheet, or three-dimensional object. As used herein, "loading" and "loading level" refer to the mass of water-borne resin composition applied to a surface of the substrate, relative to the surface area of the substrate. Of course, a particular loading level of water-borne resin composition may penetrate to different depths in the thickness dimensions of different substrates, including substrates made of different fibers. Hence, different substrates may accommodate different loading levels before desired levels are achieved. By way of example, not intended to be limiting, most paperboards can be loaded with up to about 0.2 to about 5.0 lb/1,000 ft$^2$ (MSF) of resin composition measured on a dry-weight basis. The desired properties of increased strength under both ambient as well as wet or humid conditions can be achieved even with relatively low levels of resin loading.

It will be appreciated that controlling the loading level involves applying the water-borne resin in a manner in which the mass of resin applied per unit area of the substrate is precisely controlled. The water-borne resin may be applied to the substrate by any of various liquid-application methods including, but not limited to, gravure printing, rod, blade, roller coating, and spraying. Preferred methods of application include rod, blade, roll coating, size press, and calendar stack. It will also be appreciated that the reinforced fibrous materials of the present invention can be prepared by either a batch process or a continuous process. Because various apparatuses capable of performing either process are well known in the art, they will not be described further herein.

The treated/impregnated fibrous substrate is then preferably dried using typical drying equipment which is well known in this art. Drying times and temperatures will, of course, vary depending upon many factors, including the type of fibrous material, the amount of resin loading, etc. In some instances, the application of heat from external sources may not be required to achieve the requisite drying. Pressure need not be applied during drying, but can be.

A reinforced fibrous material according to the present invention comprises either at least one fibrous web, which may be sheet-like, or a three-dimensional molded product. When the reinforced fibrous material is comprised of only one web or "ply," the ply comprises at least one substantially continuous stratum of fibers located within the thickness dimension of the web. The treated/impregnated stratum can be located on either the obverse or reverse face of the web or on both faces.

A reinforced fibrous material according to the present invention can also be comprised of multiple plies, such as, for example, multiple layers of paper, corrugated papers and boards, and multi-walled bag stocks. In such multiple-ply materials, it is not necessary that all the plies have a resin treatment. The present invention encompasses multiple-ply materials wherein only one ply thereof has at least one resin treated or impregnated stratum. The present invention also encompasses multiple-ply materials wherein multiple plies each have at least one resin treated or impregnated stratum. Each stratum need not have the same loading level. In multiple-ply materials according to the present invention, each ply can be made from the same or a different fibrous web. The webs need not all have the same basis weight, thickness, porosity, or texture.

In some instances, when the reinforced fibrous material is comprised of more than one ply, the plies are typically superimposed and adhered together. Adhering the plies together can be achieved by adhering non-treated faces to non-treated faces, non-treated faces to treated faces, and treated faces to treated faces. The outermost faces of such multiple-ply materials need not be resin treated faces.

One example, not intended to be limiting, of a multiple-ply material according to the present invention is a corrugated paperboard wherein at least one of the plies thereof has at least one resin treated stratum. As used herein, a "corrugated paperboard" is a widely recognized product comprising at least two plies of paperboard adhered together, where at least one of the plies is corrugated (i.e., fluted) in a manner known in the art. The corrugated ply is generally referred to as the "medium" or "fluting". At least one of said plies is not corrugated and is used as a facing sheet for the corrugated paperboard. Hence, the non-corrugated ply is termed a "liner board." Typical corrugated paperboards are comprised of a corrugated medium sandwiched between two liner boards adhered to the corrugated medium. The liner board(s) of a corrugated paperboard often have a larger basis weight than the corrugated medium. Any suitable adhesive can be used to adhere the liner boards to the corrugated medium. A corrugated paperboard can also comprise multiple plies of corrugated medium separately interposed between plies of liner boards. Corrugated paperboards are widely used for making cartons and the like.

Because drying of the treated water-borne resin composition is carried out at moderate temperatures, drying of the water-borne resin composition applied to a paperboard can be performed simultaneously with the corrugation of the paperboard. No special drying equipment is required. Conventional corrugators impart a certain amount of heat and pressure to the paperboard as the paperboard passes through the corrugator, enhancing drying of the resin. Simultaneous drying and corrugation can be advantageous when making treated corrugated medium according to the present invention because conventional process machinery can be readily and inexpensively adapted to include a coater, impregnator, sprayer, or the like. In such an instance, the coater, impregnator, sprayer, or the like is added to the process machinery upstream of the corrugator. As the paperboard to which the water-borne resin composition has been applied passes through the corrugator rolls, the resin may undergo additional drying simultaneously with impression of corrugations (i.e., flutes) into the paperboard.

As can be appreciated, the water-borne resin composition of the present invention imparts a substantial reinforcement to a fibrous web, sheet, or three-dimensional object enabling the reinforced fibrous material to exhibit a ring crush-resistance that is greater than the ring crush-resistance of a corresponding non-reinforced web, sheet, or three-dimensional object. Ring crush resistance is a good predictor of edge crush resistance as well as box crush resistance. Hence, with products made from a water-borne resin reinforced material produced according to the present invention, one may use lesser amounts of fibrous material (i.e., lower basis weights) or may use lower quality materials and still obtain a ring crush resistance equal to the ring crush resistance of similar products made from a non-reinforced web, sheet, or three dimensional object of the same fibrous material. Thus, practice of the present invention can yield considerable savings in cost and weight while potentially adding other benefits such as wet strength and rigidity under ambient as well as humid and/or wet conditions.

The reinforced fibrous materials of the present invention can be adhered together using conventional adhesives. For example, reinforced corrugated paperboards can be assembled from a corrugated medium and at least one liner board (wherein at least one of the medium and liner boards is reinforced according to the present invention) using conventional water-borne adhesives such as starch-based adhesives, latex-based adhesives, or latex-starch adhesives to adhere both treated and untreated surfaces together. Alternatively, if desired, conventional non-water-borne adhesives can also be used. Such non-water-borne adhesives include, but are not limited to, hot-melt adhesives, polyurethanes, isocyanates, epoxies, rubber-based adhesives, various solvent-borne polymers, mastics, silicones, and polyethylene lamination.

While the present invention has been described with respect to use in paper and paperboard substrates, there are numerous other uses. These include, but are not limited to, the manufacture of spiral cans from paperboard, multi-wall bag stocks, folding carton stock, beverage carton stock, honeycomb packaging materials, textiles, towels, biodegradable polymeric materials, tissues, and paper articles requiring outdoor exposure resistance.

In order that the invention may be more readily understood, reference is made to the following examples, which are intended to be illustrative of the invention, but are not intended to be limiting in scope.

EXAMPLE 1

A water-borne resin composition was applied as a 55% solids solution to a 36 pound/MSF basis weight corrugating medium. The resin was produced from a blend of α-methylstyrene and vinyltoluene monomers, commercially available under the designation Piccotex-LC55WKX from Hercules, Inc. The resin was applied using a #8 threaded rod and was heated for one minute at 177° C. in a convection oven.

A ring crush test (TAPPI test method T 822, Ring Crush of Paperboard) was carried out after conditioning of both the resin-treated and an untreated section of medium at 90% relative humidity and 23° C. Tests were performed in both the machine and cross directions under these test conditions. The ring crush test measures edgewise compression strength of paperboard (or corrugating medium) by positioning a sample strip (½ inch wide by 6 inches long) in a circular holder and applying a compression force to the edge of the "ring" of paperboard. Test results are reported in pounds of force/inch required to crush the specimen.

Ring crush test (RC) values are predictive of other important compressive strength performance tests including edge crush test (ECT), which is a test of edgewise compressive strength, parallel to the flutes, of a short column of corrugated fiberboard. RC and ECT values are directly related to box compression strength values via the McKee formula which is used in the art to predict the top-to-bottom compression strength of corrugated boxes. A short version of the McKee formula is: C=5.87×ECT×(combined board caliper)$^{1/2}$×(box perimeter), where C is the top-to-bottom compression strength, and ECT is the edge crush test value (in pounds of force per inch) of the combined board.

The resin-treated medium exhibited a 31% enhancement in machine direction strength over the untreated medium under the same humid conditions. The enhancement in strength was calculated as:

Ring Crush Value (Treated)–Ring Crush Value (Untreated) Ring Crush Value (Untreated)

EXAMPLE 2

Using the same test procedures as reported in Example 1 (using a No. 8 threaded rod), several additional resin-treated medium samples (33 pound/MSF basis weight paper) were tested: (1) under ambient humidity conditions (% relative humidity varied between 32–65% RH), and (2) at 90% relative humidity and 23° C. The results were compared with untreated samples of the same medium. The results are reported below.

| Resin | % Total Solids | Ambient Humidity Enhancement | 90% Humidity Enhancement |
|---|---|---|---|
| poly-α-methyl styrene/vinyl toluene[1] | 55.0 | 40.7 | 44.4 |
| poly-α-methyl styrene[2] | 55.5 | 34.2 | 40.6 |
| hydrogenated poly-dicyclopentadiene[3] | 30.2 | 15.9 | 35.3 |
| hydrogenated poly-dicyclopentadiene[4] | 27.0 | 10.0 | 29.9 |
| glycerin ester of tall oil rosin[5] | 60.0 | 39.3 | 26.1 |
| hydrocarbon resin[6] | 43.0 | 20.1 | 24.0 |
| hydrogenated poly-aliphatic (C5) hydrocarbon[7] | 30.6 | 15.3 | 14.2 |
| pentaerythritol ester of tall oil rosin[8] | 55.0 | 21.6 | 13.4 |
| hydrogenated poly-dicyclopentadiene[9] | 30.0 | 11.9 | 12.1 |
| gum rosin modified maleic resin[10] | 25.0 | 11.0 | 11.5 |
| Tall oil rosin ester[11] | 55.5 | 33.4 | 9.7 |
| Uncoated | 0 | 0 | 0 |

[1]Piccotex-LC55WKX (Hercules, Inc.)
[2]Tacolyn 1070 (avg. of three)(Hercules, Inc.)
[3]GR5320 (from Exxon, Inc., then emulsified)
[4]GR5340 (Exxon, Inc., then emulsified)
[5]Aquatac 6085 (Arizona Chemical Co.)
[6]Tacolyn 5003 (Hercules, Inc.)
[7]H100R X2 (Eastman Chemical Co.)
[8]Aquatac 4188 (Arizona Chemical Co.)
[9]GR5300 (Exxon, Inc., then emulsified)
[10]Resinall 802 (Resinall, Inc., then dispersed)
[11]Tacolyn 1085 (Hercules, Inc.)

EXAMPLE 3

Using the same test procedures as reported in Example 1 (but using a smooth rod), several additional resin-treated medium samples (33 pound/MSF basis weight) were tested and compared with untreated samples of the same medium. The results are reported below.

| Resin | % Total Solids | Ambient Humidity Enhancement | 90% Humidity Enhancement |
|---|---|---|---|
| hydrocarbon resin from aromatic monomers[1] | 51.0 | 30.0 | 65.5 |
| hydrocarbon resin from aromatic monomers (C7/C9)[2] | 51.0 | 26.8 | 55.6 |
| polyterpene[3] | 51.0 | 29.2 | 45.2 |
| poly-β-pinene[4] | 51.0 | 21.0 | 40.3 |
| terpene phenolic[5] | 50.3 | 30.7 | 40.3 |
| poly-α-methyl styrene[6] | 55.0 | 34.5 | 36.9 |
| tall oil rosin ester[7] | 50.0 | 30.4 | 33.6 |
| poly-α-methyl styrene/vinyl toluene[8] | 55.0 | 39.4 | 33.1 |
| C5/C9 hydrocarbon resin (with more C9)[9] | 50.0 | 29.8 | 30.6 |
| hydrocarbon resin from aliphatic monomers (C9)[10] | 50.0 | 31.5 | 29.9 |
| glycerol ester of tall oil rosin (non-hydrogenated)[11] | 55.0 | 21.7 | 29.1 |
| C5/C9 hydrocarbon resin (with more C5)[12] | 50.0 | 28.6 | 29.0 |
| glycerol ester of tall oil rosin (non-hydrogenated)[13] | 55.0 | 31.4 | 25.9 |
| hydrocarbon resin from hydrogenated C5 hydrocarbon, modified with C/9 hydrocarbon and dicyclopentadiene[14] | 48.8 | 31.7 | 23.8 |
| glycerol ester of tall oil rosin (non-hydrogenated), modified with C5 and C9 hydrocarbon resin[15] | 55.0 | 24.8 | 22.2 |
| pentaerythritol ester of hydrogenated wood rosin[16] | 38.8 | 24.9 | 21.2 |
| poly-vinyl toluene/styrene acrylic[17] | 50.0 | 16.0 | 20.1 |
| glycerol ester of tall oil rosin (non-hydrogenated)[18] | 55.0 | 23.4 | 18.5 |
| hydrogenated poly-dicyclopentadiene[19] | 46.2 | 31.0 | 13.2 |
| Uncoated | 0 | 0 | 0 |

[1] Aquamix 703 (Harwick)
[2] Aquamix 858 (Harwick)
[3] Aquamix 789 (Harwick)
[4] Aquamix 715 (Harwick)
[5] HRJ 11873 (Schenectady Chemicals, Inc.)
[6] Tacolyn 1070 (average of four) (Hercules, Inc.)
[7] Tacolyn 1085 (Hercules, Inc.)
[8] Piccotex LC55WK (Hercules, Inc.)
[9] EHCV (Polysat)
[10] Eccorez HC101 (Eastern Color)
[11] Snowtac 780G (Akzo Nobel)
[12] HCRE SF (Polysat)
[13] Experimental DM399010G (Akzo Nobel)
[14] GR5690 (Exxon, Inc., then emulsified)
[15] Snowtac 880G (Akzo Nobel)
[16] Pentalyn H55WBX (Hercules, Inc.)
[17] Polysat 150 (Polysat)
[18] Snowtac 790 (Akzo Nobel)
[19] GR5320 (Exxon, Inc., then emulsified)

While certain representative embodiments and details have been shown for purposes of illustrating the invention, it will be apparent to those skilled in the art that various changes in the methods and apparatus disclosed herein may be made without departing from the scope of the invention, which is defined in the appended claims.

What is claimed is:

1. A reinforced fibrous material comprising at least one fibrous substrate having first and second major surfaces, at least one major surface of said fibrous substrate treated with a water-borne composition to provide said fibrous material with increased strength under both ambient as well as wet or humid conditions, wherein said water-borne composition consists of a blend of: (a) a resin selected from the group consisting of synthetic hydrocarbon resins polymerized from monomers or oligomers of coal tar feed stocks, synthetic hydrocarbon resins polymerized from monomers or oligomers of petroleum feed stocks, and synthetic hydrocarbon resins polymerized from monomers or oligomers of turpentine feed stocks; natural resins from rosins, fossil resins, mined resins, and secretion products from insects; chemical derivatives and adducts of such natural resins; and mixtures of such synthetic hydrocarbon and natural resins; and (b) a wax.

2. A reinforced fibrous material comprising at least one fibrous substrate having first and second major surfaces, at least one major surface of said fibrous substrate treated with a water-borne composition to provide said fibrous material with increased strength under both ambient as well as wet or humid conditions, wherein said water-borne composition comprises a blend of: (a) synthetic hydrocarbon resins polymerized from monomers or oligomers of coal tar feed stocks, synthetic hydrocarbon resins polymerized from monomers or oligomers of petroleum feed stocks, and synthetic hydrocarbon resins polymerized from monomers or oligomers of turpentine feed stocks; and (b) a wax.

3. A reinforced fibrous material as claimed in claim 2 wherein said synthetic hydrocarbon resin comprises polymerized products of C4–C12 aliphatic monomers.

4. A reinforced fibrous material as claimed in claim 2 wherein said synthetic hydrocarbon resin comprises polymerized products of C8–C12 aromatic monomers.

5. A reinforced fibrous material as claimed in claim 4 wherein said C8–C12 aromatic monomers are selected from the group consisting of α-methylstyrene and vinyl toluene.

6. A reinforced fibrous material comprising at least one fibrous substrate having first and second major surfaces, at least one major surface of said fibrous substrate treated with a composition to provide said fibrous material with increased strength under both ambient as well as wet or humid conditions, wherein said composition comprises (1) water; (2) a resin selected from the group consisting of (a) synthetic hydrocarbon resins polymerized from monomers or oligomers from coal tar feed stocks, synthetic hydrocarbon resins polymerized from monomers or oligomers of petroleum feed stocks, synthetic hydrocarbon resins polymerized from monomers or oligomers of turpentine feed stocks, and mixtures thereof; and (b) natural resins selected from the group consisting of rosins, fossil resins, mined resins, secretion products from insects; and chemical derivatives and adducts of such natural resins; and (3) a wax.

7. A process for enhancing the strength of a fibrous substrate under wet or humid conditions comprising providing a fibrous substrate having first and second major surfaces, coating at least one of said major surfaces of said fibrous substrate with a reinforcing coating consisting of a blend of a water-borne resin selected from the group consisting of synthetic hydrocarbon resins polymerized from monomers or oligomers of coal tar feed stocks, synthetic hydrocarbon resins polymerized from monomers or oligomers of petroleum feed stocks, and synthetic hydrocarbon resins polymerized from monomers or oligomers of turpentine feed stocks; natural resins from rosins, fossil resins, mined resins, and secretion products from insects; chemical derivatives and adducts of such natural resins; and mixtures of such synthetic hydrocarbon and natural resins; and a wax, and drying said fibrous substrate.

8. A process for enhancing the strength of a fibrous substrate under wet or humid conditions comprising providing a fibrous substrate having first and second major surfaces, coating at least one of said major surfaces of said fibrous substrate with a reinforcing coating comprising a blend of a water-borne synthetic hydrocarbon resin and a wax, and drying said fibrous substrate.

9. A process as claimed in claim 8 wherein said water-borne synthetic hydrocarbon resin comprises polymerized products of C4–C12 aliphatic monomers.

10. A process as claimed in claim 8 wherein said water-borne synthetic hydrocarbon resin comprises polymerized products of C8–C12 aromatic monomers.

11. A process as claimed in claim 10 wherein said C8–C12 aromatic monomers are selected from the group consisting of α-methylstyrene and vinyltoluene.

* * * * *

UNITED STATES PATENT AND TRADEMARK OFFICE
CERTIFICATE OF CORRECTION

PATENT NO. : 7,148,271 B2 Page 1 of 1
APPLICATION NO. : 10/208922
DATED : December 12, 2006
INVENTOR(S) : Michelman et al.

It is certified that error appears in the above-identified patent and that said Letters Patent is hereby corrected as shown below:

Col. 2, line 67 "No." should read --Nos.--;
Col. 9, line 56 "177° C." should read --177° C--; and
Col. 10, line 17 "Ring Crush Value (Treated)-Ring Crush Value (Un-
treated) Ring Crush Value (Untreated)"
should read --Ring Crush Value (Treated) - Ring Crust Value (Untreated)
Ring Crush Value (Untreated)

Signed and Sealed this

Twenty-second Day of May, 2007

JON W. DUDAS
*Director of the United States Patent and Trademark Office*